Patented Feb. 1, 1927.

1,616,164

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

PRODUCTION OF INULIN AND INULIN DERIVATIVES.

No Drawing. Application filed December 27, 1919, Serial No. 347,797. Renewed October 1, 1926.

This invention relates to the production of inulin and inulin derivatives from inulin-bearing plants.

I am aware that various investigators have described methods for producing fructose from dahlia roots by extracting comminuted roots with water, separating the inulin therefrom by various means, and then hydrolyzing the inulin so obtained to fructose by means of acids. When, however, these various methods are employed, a great many difficulties are encountered in carrying out their processes, the yield of fructose is wholly unsatisfactory for commercial purposes, and the product obtained in many instances is not sufficiently pure for use as a food product. The method heretofore used has been to extract the bulbs with water containing a small percentage of calcium carbonate to obtain a neutral extract containing inulin, so that the latter is not hydrolyzed by free organic acids, and then immediately, without further purification, separating the inulin either (1) by freezing the solution, allowing the ice to melt, and filtering off the inulin, or (2) by immediately precipitating the inulin from the unpurified solution by the addition of alcohol, and finally hydrolyzing the inulin thus obtained to fructose by heating with acid. Now, I have found that when the process is carried out in any of these ways, the inulin which is separated at one stage of the process is not suitable for further hydrolysis to fructose, because of the fact that it still contains objectionable organic and inorganic impurities which interfere seriously with the conversion of the inulin to fructose and with separating the fructose in solid or crystalline condition from its solutions. Moreover, these processes are wasteful in that a large proportion of the inulin is lost at various stages in the process and cannot be conveniently recovered, and also because the presence of the impurities in the inulin requires the use of such vigorous hydrolyzing agents, that part of the fructose is decomposed and entirely lost.

Inulin is a carbohydrate of high molecular weight, nearly insoluble in cold water, but very soluble in hot water. Upon complete hydrolysis it yields of the monoses only fructose. It occurs widely distributed in various plants, but, as a rule, only in very small amounts, so that the isolation of this product from most plants in a commercial way is not practicable. It occurs in somewhat larger proportions in the class of plants known as the compositæ, but in most of these also the amount present is too small for successful isolation by any commercially practicable process. In the roots of the chicory plant and in the roots of the artichoke, and particularly in the large roots of the dahlia plant, inulin occurs in much greater amounts than in the other plants just mentioned, and by means of my process I can recover the inulin from these plants in an entirely practicable manner, and in such a state of purity that it can be readily converted by subsequent steps in my process into fructose, which is an important food product. This last mentioned sugar, the production of which is the ultimate aim of my process, possesses many inherent advantages over other sugars as an article of food. For example, it is approximately sixty per cent sweeter than ordinary cane sugar, and nearly four times as sweet as glucose. It is also more palatable, having no objectionable characteristic flavor, such as some other sugars have. Its keeping qualities are good, either in the form of syrup or in crystalline or powdered condition.

Moreover, fructose and also inulin are highly beneficial as foods for diabetics. For example, fructose may be substituted for sugar as a sweetening agent in various articles of diet used in the treatment of diabetic cases, without producing the harmful effects which are known to result from cane sugar, glucose, and many other sugars. Likewise, while inulin is not sweet and is practically tasteless, it may be used as such without first hydrolyzing to fructose as a substitute for flour in making bread, etc. Also, if desired, valuable food products may be formed without carrying the hydrolysis of the inulin to completion, because the incompletely hydrolyzed inulin is capable of forming gelatinous products somewhat similar to those made from ordinary gelatine and sold under certain trade-names, such as "Jello," etc.

In working out my process I have found that the inulin in the extract obtained from plants is in part associated with and in part chemically combined with certain impurities which are difficult to remove, and which greatly interfere with the production of fructose from those extracts by any of the hitherto known methods. These impurities are partly of an organic and partly of an inorganic nature. I have found that among these impurities are phosphates of alkalies, of alkaline earths, and of alumina and probably compounds of organic acids with these same inorganic bases. Inulin itself forms complex compounds with some of these inorganic bases. For example, definite compounds of inulin with barium have been prepared and are described in the scientific literature pertaining to inulin. Hitherto the chemical nature of these impurities has not been clearly recognized, and up to the present the methods used have not effectively removed them from their combination with the inulin, so that when the latter is hydrolyzed, larger quantities of acids are required to combine with these impurities and to effect hydrolysis. I have found that these larger quantities of acids bring about a decomposition of the inulin and also of the fructose, resulting in serious loss of the food products which are the ultimate aim of my process. Also, the products formed contain objectionable amounts of impurities.

Furthermore, I have found that successful hydrolysis of the inulin to fructose depends to a very large extent upon an adjustment of the hydrogen ion concentration to a range of values within very narrow limits. If the concentration of the hydrogen ion is too high, the objectionable decomposition of the carbohydrates referred to above is an inevitable result. On the other hand, if the concentration of the hydrogen ion is too low, it is necessary to prolong the time of hydrolysis to such an extent that the slow decomposition of fructose which is normally taking place all the time during the hydrolysis, causes objectionable loss of the carbohydrates. Furthermore, I have found that the amount and nature of the inorganic impurities have a pronounced effect upon the concentration of hydrogen ion produced by the addition of a given quantity of acid to the solution. This effect results from the shifting of the equilibrium relations between hydrogen ion and other ions present produced by the addition of other ions to the system. For example, it is well known that the addition of hydrochloric acid to a solution containing $Na_2HPO_4$ results in the production of $NaH_2PO_4$ with no appreciable increase in the hydrogen ion concentration of the solution, since the degree of dissociation of this last named salt is relatively small as compared with hydrochloric acid.

In addition to these inorganic impurities, the objectionable effects of which have just been discussed, the extracts from the inulin-bearing plants contain various organic impurities which are in part combined not only with the inorganic impurities, but some of which are probably combined directly with the inulin itself in such a way that their removal is rendered difficult by the application of any of the hitherto known methods. As already mentioned, these organic impurities also interfere with the successful hydrolysis of inulin to fructose. This is probably due in part to the effect they produce upon hydrogen ion concentration in somewhat the same way that the inorganic impurities produce this effect, but in addition these organic impurities also affect the properties of the fructose in a detrimental way. For example, they form soluble complexes with the inulin and render it more difficult to precipitate from solution by means of alcohol, or by freezing. Likewise, these organic impurities, unless removed, appear in the final product of the hydrolysis of inulin, increasing the hygroscopic properties of fructose so that it may become lumpy, and also adversely affecting its keeping qualities.

By my process I avoid all these difficulties. Among other means which I employ, I treat the extract containing the inulin with a weak base, preferably with magnesium hydroxide, whereby a large proportion of these objectionable impurities is removed, both of organic and inorganic nature. Particularly, the organic acids and the phosphates are thus removed, which impurities, as already explained, seriously interfere with the production of the correct hydrogen ion concentration required for the successful hydrolysis of the inulin to fructose. The remainder of the objectionable impurities, together with the small amount of magnesium salts which are left in the solution by this treatment, are removed in a later step of my process in which the inulin after precipitation with alcohol (preferably about three volumes to one of solution,) and then filtering, is washed first with concentrated alcohol to remove organic impurities, and then with cold water to remove water-soluble impurities, including the inorganic material. This step of my process is rendered more effective by first dehydrating the inulin, which I prefer to do by heating the inulin solution or suspension after the addition of alcohol for a sufficient length of time to partially dehydrate the inulin so that its subsequent washing can be carried out without danger of serious loss due to its solution in the wash liquids. By the expression "to partially dehydrate" I mean the removal of a limited amount of water from the suspended or colloidally dissolved inulin whereby the inulin is coagulated to a definite degree, this degree being such that it is no longer dissolved or taken up by the water to any objectionable extent when washed upon a filter and yet is sufficiently porous or granular or free from horny masses to promote the percolation of the water throughout the precipitated material. Dehydration in this sense is distinguished from ordinary drying mainly by the fact that horny masses are avoided. In my process I prefer to adjust the concentration of the alcohol used in precipitating the inulin to such a value that it aids in the dehydration of the inulin to the required degree. The concentration which I particularly prefer is approximately three volumes of alcohol to one of solution. By another modification of my method I digest the inulin after precipitation with alcohol with approximately ninety-five per cent alcohol at an elevated temperature and for a sufficient length of time to bring about the desired dehydration. After this treatment the inulin upon drying is left in a powdery dry condition, instead of in the form of a more or less horny mass which is produced when the inulin is dried without this partial dehydration. It will be understood that the proportions of alcohol employed in bringing about this dehydration and the time and temperature may be varied to a certain extent without departing from my invention.

Having described the most important features of my invention, I shall now give a detailed description of the exact mode and manner in which my process may be carried out in a practical manner. It will be understood, however, that this description is given as an example of one of the modes of my process, and that my invention is not confined to the exact detailed description of the processes as set forth.

I take 750 pounds of dahlia bulbs, grated very fine, 1,000 pounds of water which may or may not be purified, clarified or distilled and heat the mixture one hour at 75° C.–80° C., then filter, add 100 pounds magnesium hydroxide suspension containing approximately 5 per cent magnesium hydroxide and heat until the temperature reaches 100° C. At this point I may pass carbon dioxide through it for twenty minutes, or until absorption is complete while maintaining the temperature at 100° C. The temperature is then maintained at 100° C. without continuing to pass carbon dioxide until excess carbon dioxide is expelled. Whether or not I have treated the mixture with carbon dioxide, I now filter the extract, evaporate it to 25 or 30 per cent concentration of inulin, add three times its volume of methyl or ethyl alcohol of approximately 95 per cent strength, keep the solution hot, preferably by boiling it in a vessel provided with a condenser to avoid loss of alcohol, then allow it to cool thoroughly. During this series of steps the inulin, together with various inorganic and organic impurities, is extracted from the dahlia bulbs, the milk of magnesia or magnesium hydroxide decomposes, coagulates and precipitates a considerable percentage of the impurities, both inorganic and organic; the carbon dioxide sets free some inulin which may be carried down with the magnesia sludge and also releases some weak organic acids from their magnesium compounds. The cold liquid, from which inulin has separated in a dense, slightly hydrated form, is filtered and the cake of inulin from the filter press is washed first with an alcohol to remove alcohol-soluble impurities and then with purified or distilled water to remove water-soluble impurities, particularly inorganic salts. The purified inulin in the filter press is now dissolved by pumping in hot purified water and the solution is filtered if necessary. At this point the solution contains inulin in a very pure form with mere traces of impurities and should be brought to a concentration of approximately 10 per cent inulin. To the solution I now add hydrochloric acid solution until the hydrogen ion concentration is .01 normal. The acidity may be determined in any appropriate manner, as for example, by titrating a sample with alkali, using an appropriate indicator; by measuring its electrical conductivity; or by measuring the hydrogen ion concentration directly by means of a standard hydrogen electrode.

The solution is now heated to 100° C. and kept at this temperature approximately one hour, or until appropriate tests have shown that the conversion of inulin to fructose has taken place to such an extent that the maximum yield will be obtained and further action of the acid is stopped by adding an equivalent amount of sodium carbonate, sodium bicarbonate, or calcium carbonate.

Instead of using hydrochloric acid to furnish the hydrogen ion concentration necessary to catalyze the hydrolysis of inulin I may use instead phosphoric acid, sulphuric acid, hydrofluoric acid, sulphurous acid, oxalic acid, formic acid, nitric acid, acid salts such as sodium bisulfate, sodium bisulfite, dihydrogen sodium phosphate or salts of strong acids with weak bases which hydrolyze easily and will yield the proper hydrogen ion concentration. Examples of the latter are aniline hydrochloride, aluminum chloride, etc. The advantage of some of these alternative sources of hydrogen ions is that they will catalyze the hydrolysis of inulin while having very little deleterious action upon the fructose produced.

The solution of fructose thus obtained, I now pass through a bone char filter to remove traces of organic impurities and coloring matter and I thus obtain a clear, colorless solution of fructose. I concentrate this solution of fructose in a vacuum evaporator and in doing this I may either carry evaporation only far enough to produce a syrup of a marketable consistency and sweetness, or I may continue the evaporation to dryness using for the final step in evaporation a vacuum drum dryer, or similar apparatus, which will yield fructose as a dry powder or in the form of thin scales having the strength, sweetness and other valuable properties of fructose. If I desire to produce fructose in the crystalline form I may proceed in either of two ways.

I may concentrate the syrup above described until it has reached a supersaturated condition and then induce crystallization by adding fructose crystals while continuing to evaporate under reduced pressure as crystallization progresses. I may stop the evaporation while some liquid still remains and separate the crystals from the mother liquor by filtration or centrifugal draining. Or, I may allow the evaporation to continue until the entire amount of fructose is obtained in a dry crystalline form.

Instead of obtaining crystals by concentrating the syrup, seeding and evaporating as above described, I may concentrate the syrup almost to dryness, dissolve it in 5 to 10 parts of absolute alcohol, allow the solution to cool, withdraw the clear upper layer which is a supersaturated solution of fructose in alcohol and recover the fructose in crystalline form by adding some crystals of fructose to this supersaturated solution and agitating until crystallization is complete. The lower layer which has separated from the clear upper layer, as just stated, is treated with the mother liquor from the fructose crystallization or with a fresh portion of absolute alcohol, heated, allowed to cool and the upper clear supersaturated layer treated to recover fructose crystals as just described.

Application Number 731,965, filed August 14th, 1924, relating to production of fructose is a division of this application.

I claim:

1. The process of purifying inulin which comprises treating an impure solution containing the same with magnesium hydroxide, then filtering, then precipitating the purified inulin from solution by the addition of a water-soluble alcohol to the purified solution.

2. The process of purifying inulin which comprises treating an impure solution containing the same with magnesium hydroxide, then filtering, then precipitating the purified inulin from solution by means of a water-soluble alcohol, then filtering off the precipitated inulin, then washing the inulin successively with an alcohol and with water.

3. The process of purifying inulin which comprises precipitating the inulin from an impure solution containing the same, partially dehydrating the precipitated inulin and then washing the precipitated partially dehydrated inulin successively with a water soluble alcohol and with water as separate steps whereby both water soluble and alcohol soluble impurities are successively removed.

4. The process of purifying inulin which comprises treating a solution containing the same with magnesium hydroxide, then filtering, evaporating to concentrate the inulin solution, then precipitating the purified inulin from solution by the addition of a water-soluble alcohol to the purified solution.

5. The process of purifying inulin which comprises treating a solution containing the same with magnesium hydroxide, then filtering, then precipitating the purified inulin from solution by the addition of a water-soluble alcohol to the purified solution, filtering, washing separately with alcohol and with water.

6. The process of purifying inulin which comprises treating a solution containing the same with magnesium hydroxide, then filtering, then precipitating the purified inulin from solution by means of an alcohol, heating, then filtering off the precipitated inulin, then washing the inulin successively with a water-soluble alcohol and with water.

7. The process of purifying inulin which comprises subjecting a solution containing the same to the action of a water-soluble alcohol with a concentration of about three volumes of alcohol to one of the solution to precipitate the inulin, subsequently removing the inulin and washing it, first with a concentrated water-soluble alcohol to remove organic impurities, and afterwards with water to remove water-soluble impurities.

8. The process of preparing inulin from plants containing the same which comprises subjecting the inulin-containing juices of the plant to the action of a water-soluble alcohol to precipitate the inulin therefrom, removing the inulin from the solution and subsequently subjecting the inulin to the action of a highly concentrated solution of a water-soluble alcohol to partially dehydrate the inulin and afterwards washing the partially dehydrated inulin first with a water-soluble alcohol and then with water, as separate steps whereby both water-soluble and alcohol-soluble impurities are removed from the inulin.

In testimony whereof I affix my signature.

WILLIAM C. ARSEM.